United States Patent
Yoshioka

(10) Patent No.: US 10,602,005 B2
(45) Date of Patent: Mar. 24, 2020

(54) IMAGE FORMING SYSTEM, PRINTER DRIVER, AND INFORMATION PROCESSING APPARATUS FOR PROCESSING ELECTRONIC FILE

(71) Applicant: KYOCERA Document Solutions Inc., Osaka (JP)

(72) Inventor: Tetsuya Yoshioka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/189,091

(22) Filed: Nov. 13, 2018

(65) Prior Publication Data
US 2019/0149674 A1    May 16, 2019

(30) Foreign Application Priority Data
Nov. 13, 2017  (JP) ................................. 2017-218325

(51) Int. Cl.
*G06F 3/12* (2006.01)
*H04N 1/00* (2006.01)
*H04N 1/32* (2006.01)

(52) U.S. Cl.
CPC ....... *H04N 1/00209* (2013.01); *G06F 3/1286* (2013.01); *H04N 1/00148* (2013.01); *H04N 1/00413* (2013.01); *H04N 1/32128* (2013.01)

(58) Field of Classification Search
None
See application file for complete search history.

(56) References Cited

U.S. PATENT DOCUMENTS

| 2006/0238786 A1* | 10/2006 | Sakura | G06F 3/1205 |
| | | | 358/1.9 |
| 2007/0028232 A1* | 2/2007 | Kim | G06F 3/1222 |
| | | | 717/174 |
| 2007/0276758 A1* | 11/2007 | Tsuzuki | G06F 21/608 |
| | | | 705/51 |

(Continued)

FOREIGN PATENT DOCUMENTS

| JP | 2005-094698 A | 4/2005 |
| JP | 2015-064731 A | 4/2015 |

*Primary Examiner* — Henok Shiferaw
(74) *Attorney, Agent, or Firm* — Hawaii Patent Services; Nathaniel K. Fedde; Kenton N. Fedde

(57) ABSTRACT

To provide an image forming system by which a printed object can be obtained in a short time after a request for image formation is issued, an image forming system includes an information processing apparatus and an image forming apparatus connected to the information processing apparatus via a network to form an image. The information processing apparatus includes a first determining unit, a second determining unit, a transmission control unit, and a transmitting unit. The first determining unit determines whether an electronic file is opened. In a case where the first determining unit determines that the electronic file is opened, the second determining unit determines whether a specific action related to image formation of the electronic file is detected. In a case where the second determining unit determines that the specific action related to image formation of the electronic file is detected, the transmission control unit controls image data related to the electronic file to be transmitted to the image forming apparatus.

8 Claims, 6 Drawing Sheets

(56) References Cited

U.S. PATENT DOCUMENTS

2013/0077130 A1* 3/2013 Yoshida ................. G06K 15/02
 358/1.15
2016/0019013 A1* 1/2016 Ido ........................ G06F 3/1286
 358/1.15

* cited by examiner

IMAGE FORMING SYSTEM, PRINTER DRIVER, AND INFORMATION PROCESSING APPARATUS FOR PROCESSING ELECTRONIC FILE

INCORPORATION BY REFERENCE

This application is based upon, and claims the benefit of priority from, corresponding Japanese Patent Application No. 2017-218325 filed in the Japan Patent Office on Nov. 13, 2017, the entire contents of which are incorporated herein by reference.

BACKGROUND

Field of the Invention

This disclosure relates to an image forming system, a printer driver, and an information processing apparatus.

Description of Related Art

In an image forming apparatus typified by a multifunction peripheral, after receiving image data transmitted from a computer connected to a network, a photosensitive member provided in an image forming unit is irradiated with light based on an obtained image, so as to form an electrostatic latent image on the photosensitive member. Subsequently, charged toner is supplied onto the formed electrostatic latent image to create a visible image, and then the toner is transferred and fixed to a sheet, which is output to the outside of the apparatus.

SUMMARY

In one aspect of the present disclosure, an image forming system includes an information processing apparatus and an image forming apparatus. The information processing apparatus launches a specific application to open and edit an electronic file. The image forming apparatus is connected to the information processing apparatus via a network to form an image. The image forming apparatus is provided with an image forming unit, a receiving unit, a storage unit, an accepting unit, and an image formation control unit. The image forming unit forms the image based on image data. The receiving unit receives the image data transmitted from the information processing apparatus. The storage unit stores the image data received by the receiving unit. The accepting unit accepts a request for image formation based on the image data. The request is issued by the information processing apparatus. The image formation is performed by the image forming unit. The image formation control unit controls the image forming unit to form the image on a sheet based on the image data stored in the storage unit in a case where the request for image formation is accepted by the accepting unit. The information processing apparatus is provided with a first determining unit, a second determining unit, a transmission control unit, and a transmitting unit. The first determining unit determines whether the electronic file is opened. The second determining unit determines whether a specific action related to image formation of the electronic file is detected in a case where the first determining unit determines that the electronic file is opened. The transmission control unit controls the image data related to the electronic file to be transmitted to the image forming apparatus in a case where the second determining unit determines that the specific action related to image formation of the electronic file is detected. The transmitting unit issues the request for forming the image on the sheet based on the image data related to the electronic file. The request is issued from a menu related to image formation of the electronic file. The request is directed to the image forming apparatus.

In another aspect of the present disclosure, a printer driver is incorporated in an information processing apparatus connected via a network to an image forming apparatus that forms an image. The printer driver causing the information processing apparatus to function as: a first determining unit that determines whether an electronic file is opened; a second determining unit that determines whether a specific action related to image formation of the electronic file is detected in a case where the first determining unit determines that the electronic file is opened; a transmission control unit that controls image data related to the electronic file to be transmitted to the image forming apparatus in a case where the second determining unit determines that the specific action related to image formation of the electronic file is detected; and a transmitting unit that issues a request for forming the image on a sheet based on the image data related to the electronic file, the request being issued from a menu related to image formation of the electronic file, the request being directed to the image forming apparatus.

In another aspect of the present disclosure, an information processing apparatus is connected via a network to an image forming apparatus that forms an image. The information processing apparatus launches a specific application to open and edit an electronic file. The information processing apparatus is provided with a first determining unit, a second determining unit, a transmission control unit, and a transmitting unit. The first determining unit determines whether the electronic file is opened. The second determining unit determines whether a specific action related to image formation of the electronic file is detected in a case where the first determining unit determines that the electronic file is opened. The transmission control unit controls the image data related to the electronic file to be transmitted to the image forming apparatus in a case where the second determining unit determines that the specific action related to image formation of the electronic file is detected. The transmitting unit issues the request for forming the image on the sheet based on the image data related to the electronic file. The request is issued from a menu related to image formation of the electronic file. The request is directed to the image forming apparatus.

DETAILED DESCRIPTION

Below is an explanation of an embodiment of this disclosure. Note that the parts below that are common or corresponds with each other in different drawings are assigned with the same reference signs, so that the same explanation is not repeated.

Figure 1:
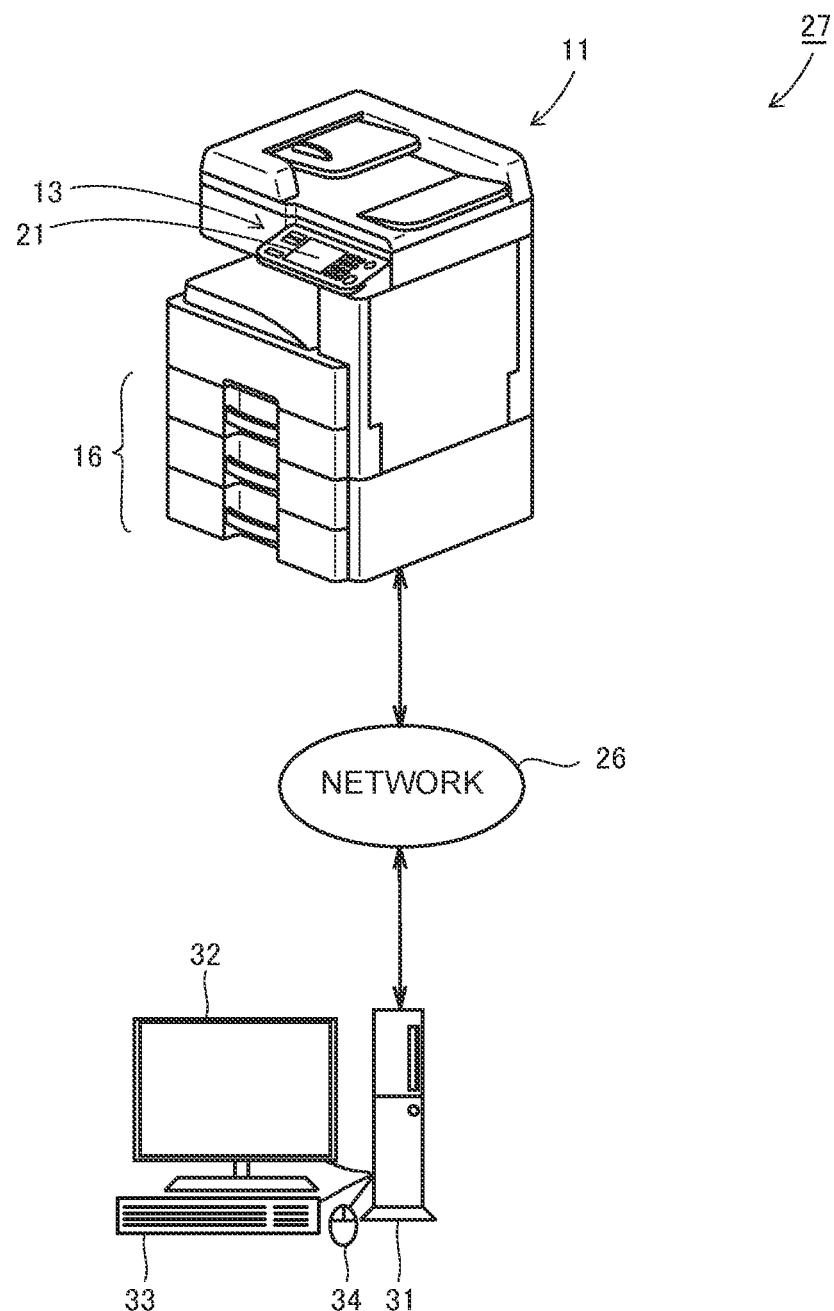
FIG. 1 is a schematic view illustrating an external view of an image forming system according to an embodiment of this disclosure.
Figure 2:
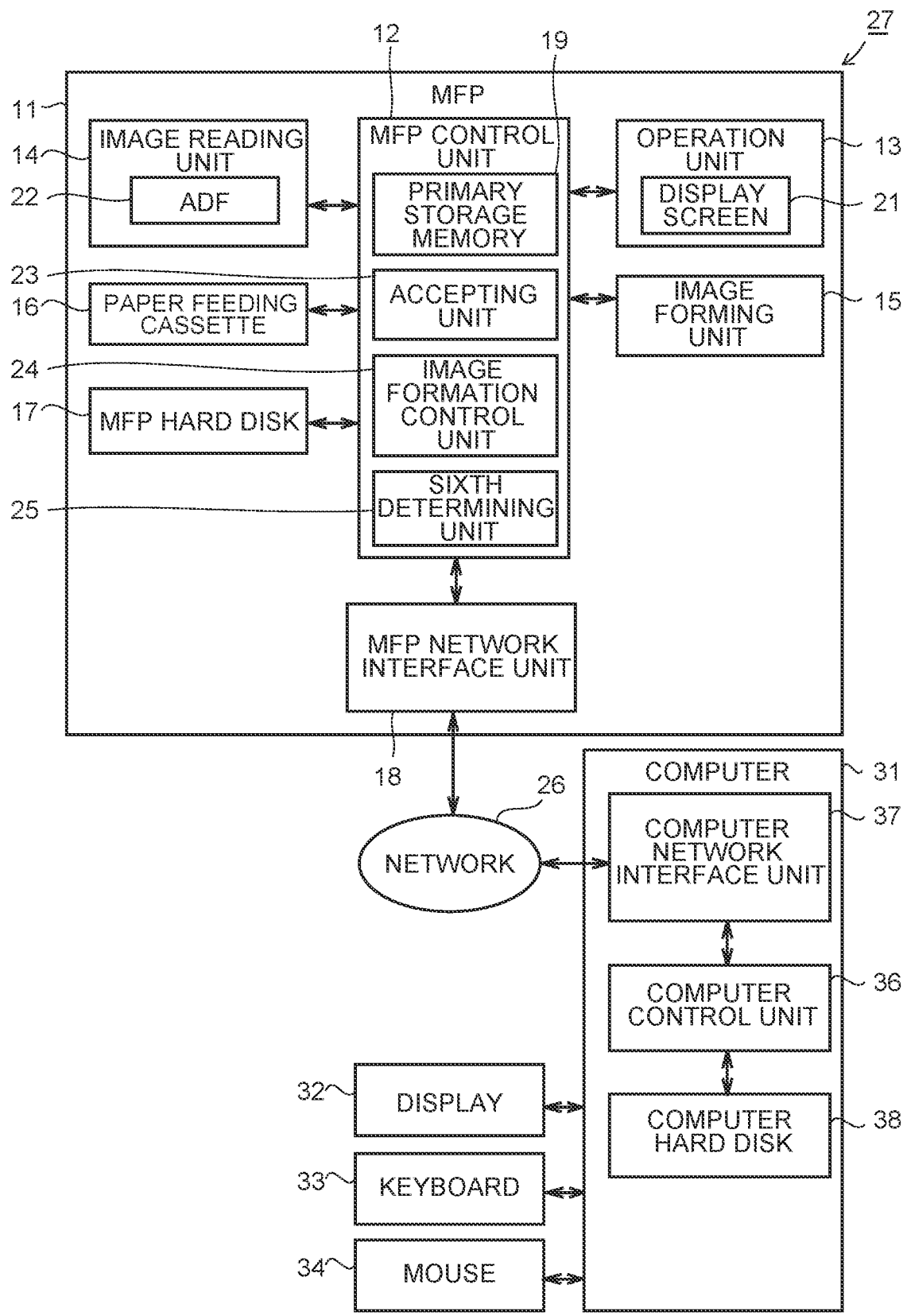
FIG. 2 is a block diagram illustrating a configuration of the image forming system illustrated in FIG. 1.

FIG. 1 is a schematic view illustrating an external view of an image forming system according to an embodiment of this disclosure. FIG. 2 is a block diagram illustrating a configuration of the image forming system illustrated in FIG. 1.

With reference to FIG. 1 and FIG. 2, an image forming system 27 according to an embodiment of this disclosure includes: a multifunction peripheral (MFP) 11 as an image forming apparatus; and a computer 31 as an information processing apparatus connected to the MFP 11 via a network 26. For example, the MFP 11 and the computer 31 are placed on the same floor of an office. The connection of the MFP 11 and the computer 31 to the network 26 may be wired or wireless.

Here, firstly, the configuration of the MFP 11 is explained. With respect to image processing, the MFP 11 has multiple functions such as a copy function, a printer function, and a facsimile function. The MFP 11 includes: an MFP control unit 12; an operation unit 13; an image reading unit 14; an image forming unit 15; a paper feeding cassette 16; an MFP hard disk 17 serving as a storage unit of the MFP 11; and an MFP network interface unit 18 that functions as a receiving unit and is for connecting to the network 26.

The MFP control unit 12 controls the entire MFP 11. Note that the MFP control unit 12 is configured with a CPU (Central Processing Unit), etc., and includes: a primary storage memory 19 that temporarily stores data; an accepting unit 23 that accepts a request for image formation, which is performed by the image forming unit 15 based on image data issued by the computer 31; an image formation control unit 24 that controls the image forming unit 15 to form an image on a sheet based on image data stored in the MFP hard disk 17 when the accepting unit 23 accepts a request for image formation; and a sixth determining unit 25 that determines whether a specific amount of time has elapsed. The operation unit 13 includes a display screen 21 serving as a display unit that displays information transmitted from the MFP 11 and content input by a user. The image reading unit 14 includes an ADF (Auto Document Feeder) 22 serving as a document conveying device that conveys a document set at a setting position to a reading position. The image reading unit 14 reads the image of a document set on the ADF 22 or a platen on which the document is placed. Three sheet feeding cassettes 16 are provided, and each of the sheet feeding cassettes 16 is capable of accommodating multiple sheets on the inside. Based on image data of a document read by the image reading unit 14 or image data transmitted via the network 26, the image forming unit 15 forms and prints an image on a sheet conveyed from a paper feeding cassette 16. The MFP hard disk 17 stores data related to image formation such as received image data, which is transmitted from the computer 31, and image forming conditions that have been input.

Next, below is an explanation of the configuration of the computer 31. To the computer 31, a display 32, a keyboard 33, and a mouse 34 are connected. On the display 32, information, data, or the like from the computer 31 is displayed. Furthermore, by use of the keyboard 33 and the mouse 34, a user inputs data to the computer 31 while checking screens displayed on the display 32.

The computer 31 includes a CPU, etc. Further, the computer 31 includes: a computer control unit 36 that controls the computer 31 itself; a computer network interface unit 37 for connecting to the network 26; and a computer hard disk 38 serving as a storage unit of the computer 31 for storing data such as image data. The computer hard disk 38 stores various types of data such as image data in a file.

Figure 3:
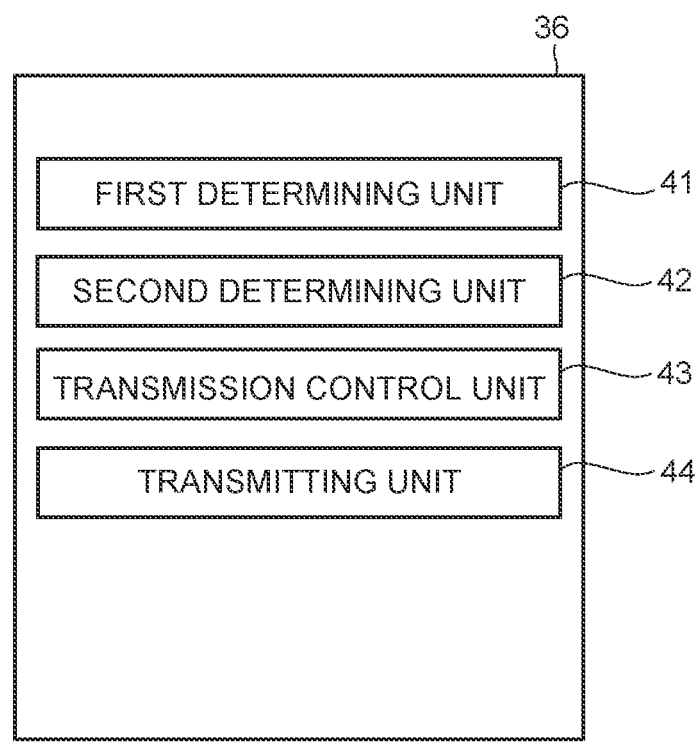
FIG. 3 is a block diagram illustrating a configuration of a computer control unit.

Next, below is an explanation of the configuration of the computer control unit 36. FIG. 3 is a block diagram illustrating the configuration of the computer control unit 36. Referring to FIG. 3, the computer control unit 36 includes a first determining unit 41, a second determining unit 42, a transmission control unit 43, and a transmitting unit 44. The first determining unit 41 determines whether an electronic file is opened. In a case where the first determining unit 41 determines that an electronic file is opened, the second determining unit 42 determines whether a specific action related to image formation of the electronic file is detected. In a case where the second determining unit 42 determines that a specific action related to image formation of an electronic file is detected, the transmission control unit 43 controls image data related to the electronic file to be transmitted to the MFP 11. The transmitting unit 44 issues, from a menu related to image formation of an electronic file, a request for forming an image on a sheet based on image data related to the electronic file to the MFP 11. The configurations of the above units are described later in detail.

Figure 4:
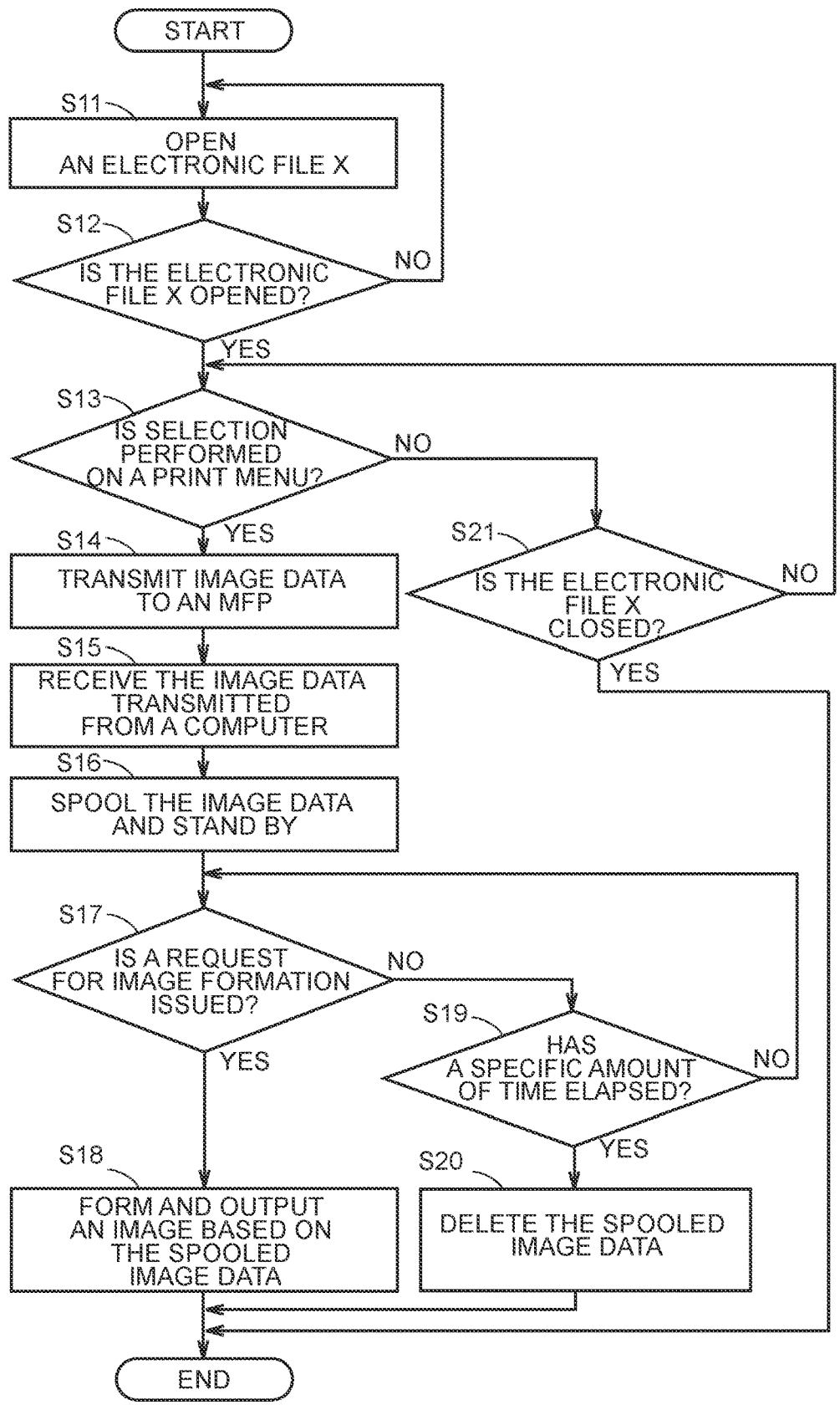
FIG. 4 is a flowchart illustrating a processing flow in a case where a computer requests a multifunction peripheral to perform image formation in the image forming system.

Next, below is an explanation of a processing flow in a case where the computer 31 requests the MFP 11 to perform image formation in the image forming system 27. FIG. 4 is a flowchart illustrating a processing flow in a case where the computer 31 requests the MFP 11 to perform image formation in the image forming system 27.

Referring to FIG. 4, a user opens, on the computer 31, an electronic file to which image formation is requested (Step S11 in FIG. 4. Hereinafter, "Step" is omitted). In this case, it is assumed that the user opens an electronic file X stored in the computer hard disk 38 using the mouse 34, etc. When the electronic file X is opened, the electronic file X is displayed on the display 32. Note that the electronic file X is configured to have multiple pages, and image data related to the electronic file X includes images corresponding to respective pages configuring the electronic file X. Further, the first determining unit 41 is in a standby state until an electronic file is opened (NO in S12).

Here, the first determining unit 41 determines that the electronic file X is opened (YES in S12). Subsequently, from multiple menus for editing the electronic file X, a user selects a print menu, which corresponds to a menu of image formation for forming an image on a sheet. Then, the second determining unit 42 determines that the print menu is selected, which is a specific action related to image formation of the electronic file X (YES in S13).

Figure 5:
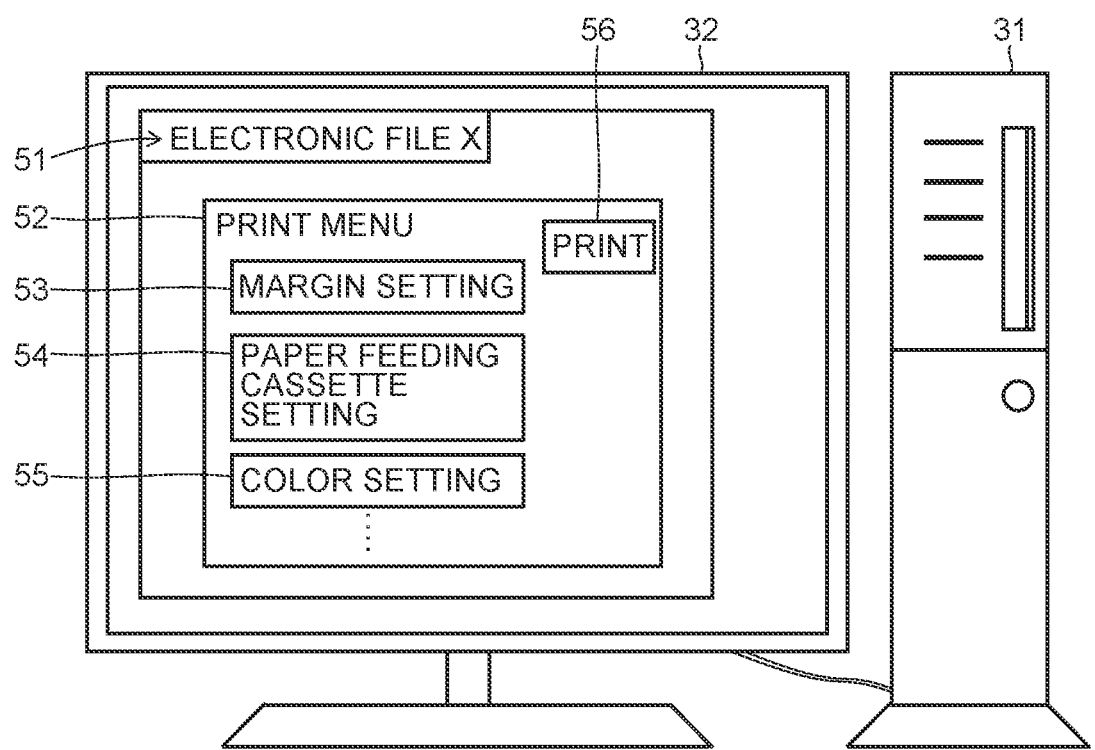
FIG. 5 is a diagram illustrating an example of a display screen of a display.

FIG. 5 is a diagram illustrating an example of a display screen of the display 32 when the print menu is selected. With reference to FIG. 5, on the display screen of the display 32, there are displayed: a file name display area 51 saying "ELECTRONIC FILE X" for indicating an opened file name; a "PRINT MENU" window 52 for indicating a selected menu; a selection key 53 saying "MARGIN SETTING", which is clicked using the mouse 34 for transition to a screen for setting a margin for printing; a selection key 54 saying "PAPER FEEDING CASSETTE SETTING", which is clicked using the mouse 34 for transition to a screen for setting of a paper feeding cassette 16, in which a sheet required for printing is stored; a selection key 55 saying "COLOR SETTING", which is clicked using the mouse 34 for transition to a screen for setting a color for printing; and an icon 56 saying "PRINT", which is clicked for issuing a print request directed to the MFP 11. When printing, a user clicks on multiple selection keys 53 through 55 in the print menu in order to perform various kinds of settings.

Here, in a case of determination that the print menu is selected, the transmission control unit 43 controls image data related to the electronic file to be transmitted (S14). Specifically, at a stage where the print menu window 52 is displayed, image data of the electronic file X configured with multiple pages are sequentially transmitted to the MFP 11 via the computer network interface unit 37, the network 26, and the MFP network interface unit 18. Note that, at this stage, a print request directed to the MFP 11 has not been issued.

On the MFP 11, image data related to the electronic file X transmitted from the computer 31 is received (S15). Then, the received image data is temporarily stored. That is, the MFP 11 spools the image data related to the received electronic file X and stands by (S16). In this case, a part of a data storage area of the MFP hard disk 17 or a part of the primary storage memory 19 may be used for storage. That is, the concept of the storage unit of the MFP 11 includes both the MFP hard disk 17 and the primary storage memory 19.

Then, the user issues a request for printing the electronic file X in the print menu on the computer 31. Specifically, the icon 56 to execute "PRINT" displayed on the print menu of the electronic file X is clicked on using the mouse 34. Then, the transmitting unit 44 issues, from the menu related to image formation of the electronic file X, a request directed to the MFP 11 to form an image on a sheet based on the image data related to the electronic file X. Then, the accepting unit 23 provided in the MFP 11 accepts the request for image formation to be performed by the image forming unit 15 based on the image data issued from the computer 31 (YES in S17).

Upon accepting the request for image formation, the image formation control unit 24 controls the image forming unit 15 to form an image on a sheet based on the image data stored in the MFP hard disk 17 or the like. That is, an image is formed on a sheet based on spooled image data (S18). Then, the processing is terminated.

According to such an image forming system 27 as above, image data related to an electronic file X is transmitted to an MFP 11 and spooled by the MFP 11 at a stage where a request for printing is not transmitted. Therefore, it is possible to start printing of the image data right upon receiving the request for printing. That is, it is possible to omit time for transmitting and spooling image data or expanding received image data. Therefore, according to such an image forming system 27 as above, it is possible to obtain a printed object in a short time after a request for printing is issued.

Note that, in S13, in a case where the print menu is not selected (NO in S13) and the electronic file X is determined to be closed (YES in S21), the processing is terminated directly. Until the electronic file X is closed, a state of standing by to see whether the print menu is selected is maintained (NO in S21).

Furthermore, in a case where, in S17, the request for printing is not issued (NO in S17) and, in the meantime, the sixth determining unit 25 determines that a specific amount of time has elapsed (YES in S19), image data stored in the MFP hard disk 17 is deleted and the processing is terminated (S20). In this way, in a case where the request for printing is not actually issued, the image data stored in the MFP hard disk 17 is deleted, so that the storage capacity of the MFP hard disk 17 is effectively utilized. Note that, until a specific amount of time elapses, a state of standing by for transmission of the request for printing is maintained (NO in S19).

Figure 6:
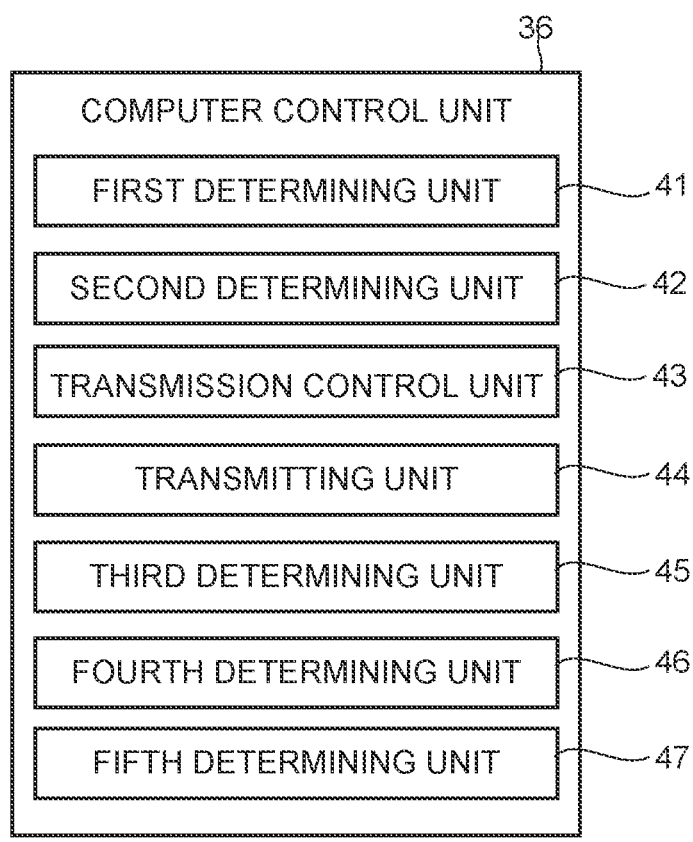
FIG. 6 is a block diagram illustrating a configuration of a computer control unit provided in a computer included in an image forming system according to anther embodiment of this disclosure.

Furthermore, the image forming system 27 may have the following configuration. That is, as illustrated in FIG. 6, there may be a configuration in which the computer control unit 36 provided in the computer 31 further includes a third determining unit 45 that determines whether a part of image data related to an electronic file is in an edited state in the computer 31. Further, in a case where the third determining unit 45 determines that a part of image data is in an edited state, the transmission control unit 43 controls the remaining part of the image data other than the part of the image data in the edited state to be transmitted to the MFP 11 first and then controls the part of the image data to be transmitted when the edited state ends. Furthermore, the image formation control unit 24 controls the remaining part of the image data and the part of the image data to be combined to form an image. There may be a configuration as follows. Specifically, for example, regarding an electronic file composed of 10 pages, in a case where the fifth page is opened on the display 32 for editing, images corresponding to first page through fourth page and sixth page through tenth pages are transmitted first. Then, the fifth page on which editing has ended is transmitted later and combined. In this way, by firstly transmitting the remaining part other than a part of image data in an edited state, it is possible to shorten the first print time while enhancing the efficiency of communication. Therefore, printing can be started in a shorter time. Such a configuration as above is especially effective in a case of printing an electronic file having a large number of pages while editing a part of the electronic file before printing. Note that a unit for editing is not limited to on a per page basis. That is, there may be a configuration of editing partially, i.e., editing a specific area of a page and subsequently transmitting difference for replacement. Note that FIG. 6 is a block diagram illustrating a configuration of a computer control unit 36 provided in a computer included in an image forming system according to anther embodiment of this disclosure.

Furthermore, the image forming system 27 may have the following configuration. That is, as illustrated in FIG. 6, there may be a configuration in which the computer control unit 36 provided in the computer 31 further includes a fourth determining unit 46 that determines whether an opened electronic file is in a specific file format. Further, in a case where the fourth determining unit 46 determines that the opened electronic file is in a specific file format, the transmission control unit 43 may control the entirety of image data related to the electronic file to be transmitted to the MFP 11. In this case, the specific file format may be, for example, a PDF file format or a file format related to image data.

Furthermore, there may be a configuration in which the computer control unit 36 provided in the computer 31 further includes a fifth determining unit 47 that determines whether an opened electronic file includes a specific character string. Further, in a case where the fifth determining unit 47 determines that a specific character string is included, the transmission control unit 43 may control the entirety of image data related to the electronic file to be transmitted to the MFP 11. With the above configurations, it is possible to more efficiently transmit image data with respect to an electronic file to which almost no edition is made, so as to start image formation in a short time. In this case, the specific character string may be, for example, a character string "patent publication".

Note that, in the above embodiment, although the image data is deleted when the sixth determining unit 25 determines that the specific amount of time has elapsed, there is not such limitation. That is, the image data may be deleted when an application for opening the electronic file X is determined to be closed.

Furthermore, in the above embodiment, although the second determining unit 42 determines whether selection in a print menu, which is the specific action, is detected, there is not such limitation. That is, for example, the second determining unit 42 may determine whether an action of moving a cursor, which is displayed on the display 32, onto a menu of an application launched when an electronic file is opened is detected as the specific action. Further, the second determining unit 42 may determine whether an action of right-clicking of the mouse 34 on the print menu is detected as the specific action.

Note that, although the computer 31 is what is termed as a desktop computer in the above embodiment, there is not such limitation. That is, the computer 31 may be a portable tablet PC or a portable terminal device.

Further, the printer driver according to this disclosure may have the following configuration. That is, the printer driver according to this disclosure is incorporated in the computer 31 connected via the network 26 to the MFP 11 that forms an image. The printer driver causes the computer 31 to function as: a first determining unit that determines whether an electronic file is opened; a second determining unit that determines whether a specific action related to image formation of the electronic file is detected in a case where the first determining unit determines that the electronic file is opened; a transmission control unit that transmits image data related to the electronic file to the MFP 11 in a case where the second determining unit determines that the specific action related to image formation of the electronic file is detected; and a transmission unit that issues, from a menu related to image formation of the electronic file, a request to form an image on a sheet based on the image data related to the electronic file to the MFP 11.

According to such a printer driver as above, it is possible to obtain a printed object in a short time after a request for image formation is issued.

Furthermore, the information processing apparatus according to this disclosure may have the following configuration. That is, the information processing apparatus may be connected via a network to an image forming apparatus that forms an image and launch a specific application to open and edit an electronic file. The information processing apparatus is provided with a first determining unit, a second determining unit, a transmission control unit, and a transmitting unit. The first determining unit determines whether the electronic file is opened. The second determining unit determines whether a specific action related to image formation of the electronic file is detected in a case where the first determining unit determines that the electronic file is opened. The transmission control unit controls the image data related to the electronic file to be transmitted to the image forming apparatus in a case where the second determining unit determines that the specific action related to image formation of the electronic file is detected. The transmitting unit issues the request for forming the image on the sheet based on the image data related to the electronic file. The request is issued from a menu related to image formation of the electronic file. The request is directed to the image forming apparatus.

According to such an information processing apparatus as above, it is possible to obtain a printed object in a short time after a request for image formation is issued.

It should be noted that the embodiments disclosed herein are entirely examples and are not limitative in terms of any aspect. The scope of this disclosure is not defined by the above explanation but by the claims, and it is intended that all modifications within meaning and a scope equivalent to the claims are included.

Especially, the image forming system and the printer driver according to this disclosure are effectively used in a case where it is required to obtain a printed object in a short time.

What is claimed is:

1. An image forming system including an information processing apparatus and an image forming apparatus, the information processing apparatus launching a specific application to open and edit an electronic file, the image forming apparatus being connected to the information processing apparatus via a network to form an image,
   the image forming apparatus comprising:
      an image forming unit that forms the image based on image data;
      a receiving unit that receives the image data transmitted from the information processing apparatus;
      a storage unit that stores the image data received by the receiving unit;
      an accepting unit that accepts a request for image formation based on the image data, the request being issued by the information processing apparatus, the image formation being performed by the image forming unit; and
      an image formation control unit that controls the image forming unit to form the image on a sheet based on the image data stored in the storage unit in a case where the request for image formation is accepted by the accepting unit,
   the information processing apparatus comprising:
      a first determining unit that determines whether the electronic file is opened;
      a second determining unit that determines whether a specific action related to image formation of the electronic file is detected in a case where the first determining unit determines that the electronic file is opened;
      a transmission control unit that controls the image data related to the electronic file to be transmitted to the image forming apparatus in a case where the second determining unit determines that the specific action related to image formation of the electronic file is detected;
      a transmitting unit that issues the request for forming the image on the sheet based on the image data related to the electronic file, the request being issued from a menu related to image formation of the electronic file, the request being directed to the image forming apparatus; and
      a third determining unit that determines whether a part of the image data related to the electronic file is in an edited state in the information processing apparatus,
   wherein, in a case where the third determining unit determines that the part of the image data is in the edited state, the transmission control unit transmits to the image forming apparatus a remaining part of the image data other than the part of the image data in the edited state first and then the part of the image data when the edited state ends, and
   wherein the image formation control unit controls the part of the image data and the remaining part of the image data to be combined to form the image.

2. The image forming system according to claim 1, wherein the specific action includes selection in the menu related to the image formation.

3. The image forming system according to claim 1, the information processing apparatus further comprising a fourth determining unit that determines whether the opened electronic file is in a specific file format, wherein, in a case where the fourth determining unit determines that the opened electronic file is in the specific file format, the transmission control unit controls an entirety of the image data related to the electronic file to be transmitted to the image forming apparatus.

4. The image forming system according to claim 3 wherein the specific file format is a PDF file format or a file format related to image data.

5. The image forming system according to claim 1, the information processing apparatus further comprising a fifth determining unit that determines whether the opened electronic file includes a specific character string, wherein, in a case where the fifth determining unit determines that the specific character string is included, the transmission control unit controls an entirety of the image data related to the electronic file to be transmitted to the image forming apparatus.

6. The image forming system according to claim 1, the image forming apparatus further comprising a sixth determining unit that determines whether a specific amount of time has elapsed, wherein, in a case where the sixth determining unit determines that the specific amount of time has elapsed, the image formation control unit controls the image data to be deleted, the image data being transmitted by the transmission control unit and stored in the storage unit.

7. A printer driver incorporated in an information processing apparatus connected via a network to an image forming apparatus that forms an image, the printer driver causing the information processing apparatus to function as:
a first determining unit that determines whether an electronic file is opened;
a second determining unit that determines whether a specific action related to image formation of the electronic file is detected in a case where the first determining unit determines that the electronic file is opened;
a transmission control unit that controls image data related to the electronic file to be transmitted to the image forming apparatus in a case where the second determining unit determines that the specific action related to image formation of the electronic file is detected;
a transmitting unit that issues a request for forming the image on a sheet based on the image data related to the electronic file, the request being issued from a menu related to image formation of the electronic file, the request being directed to the image forming apparatus; and
a third determining unit that determines whether a part of the image data related to the electronic file is in an edited state in the information processing apparatus,
wherein, in a case where the third determining unit determines that the part of the image data is in the edited state, the transmission control unit transmits to the image forming apparatus a remaining part of the image data other than the part of the image data in the edited state first and then the part of the image data when the edited state ends, and
wherein the image formation control unit controls the part of the image data and the remaining part of the image data to be combined to form the image.

8. An information processing apparatus connected via a network to an image forming apparatus that forms an image, the information processing apparatus launching a specific application to open and edit an electronic file, the information processing apparatus comprising:
a first determining unit that determines whether the electronic file is opened;
a second determining unit that determines whether a specific action related to image formation of the electronic file is detected in a case where the first determining unit determines that the electronic file is opened;
a transmission control unit that controls image data related to the electronic file to be transmitted to the image forming apparatus in a case where the second determining unit determines that the specific action related to image formation of the electronic file is detected;
a transmitting unit that issues a request for forming the image on a sheet based on the image data related to the electronic file, the request being issued from a menu related to image formation of the electronic file, the request being directed to the image forming apparatus; and
a third determining unit that determines whether a part of the image data related to the electronic file is in an edited state in the information processing apparatus,
wherein, in a case where the third determining unit determines that the part of the image data is in the edited state, the transmission control unit transmits to the image forming apparatus a remaining part of the image data other than the part of the image data in the edited state first and then the part of the image data when the edited state ends, and
wherein the image formation control unit controls the part of the image data and the remaining part of the image data to be combined to form the image.

* * * * *